United States Patent Office 3,424,128
Patented Jan. 28, 1969

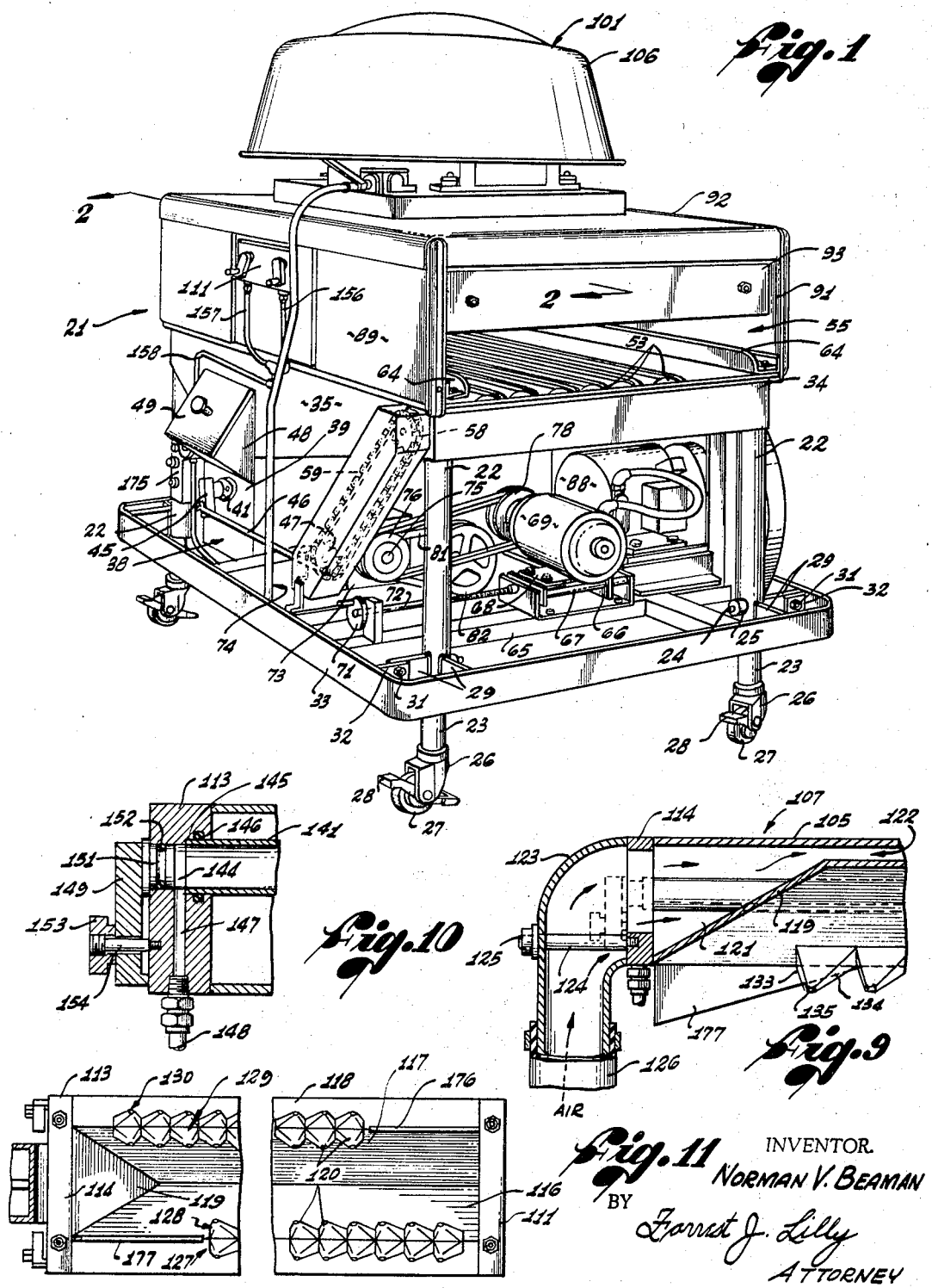

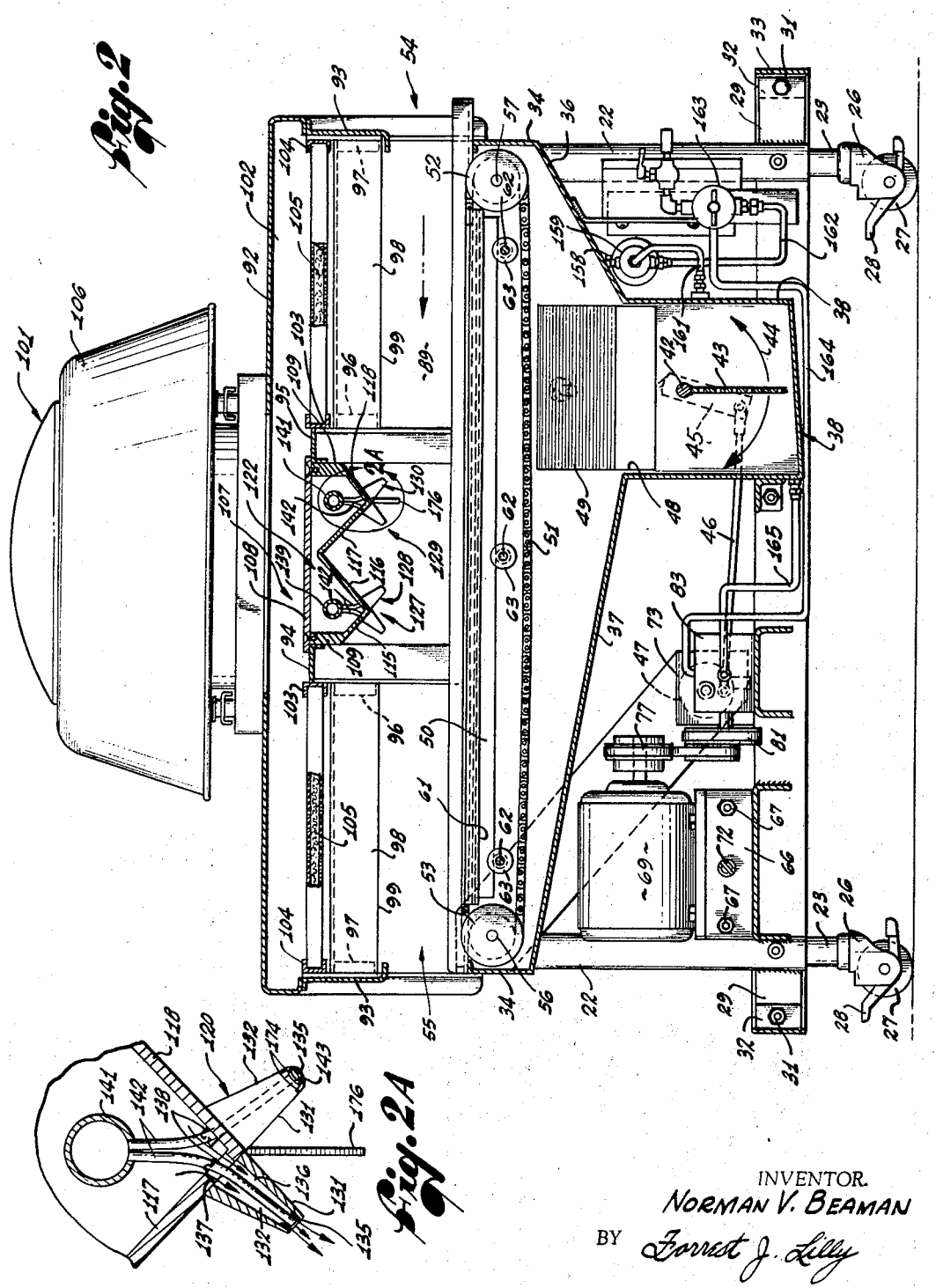

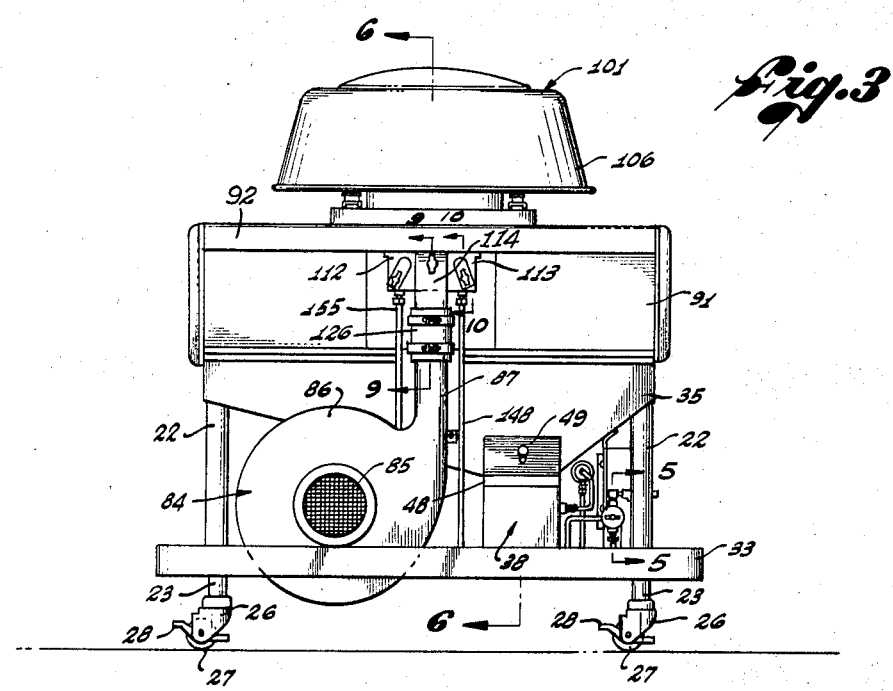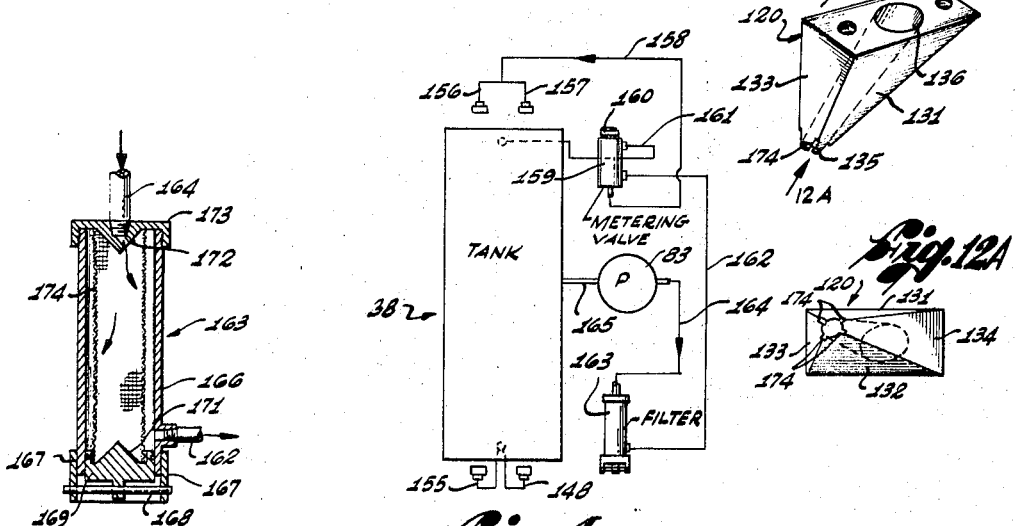

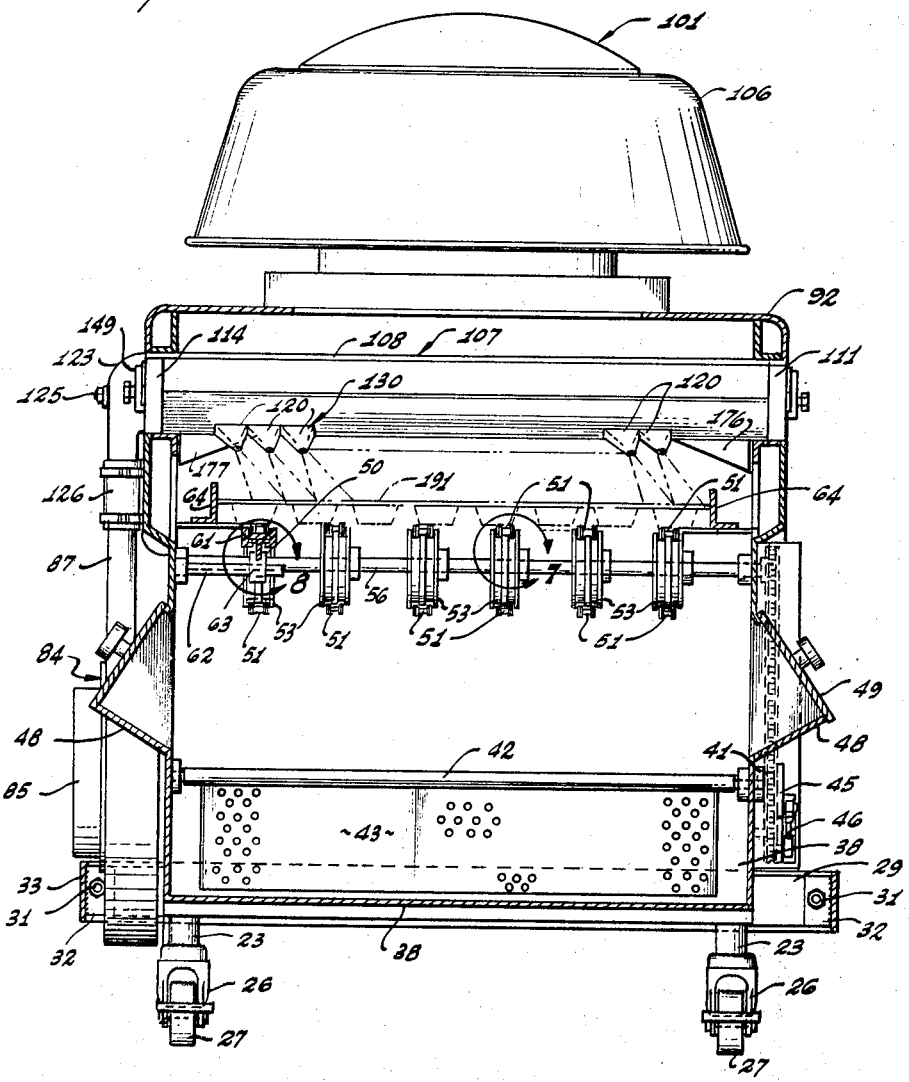

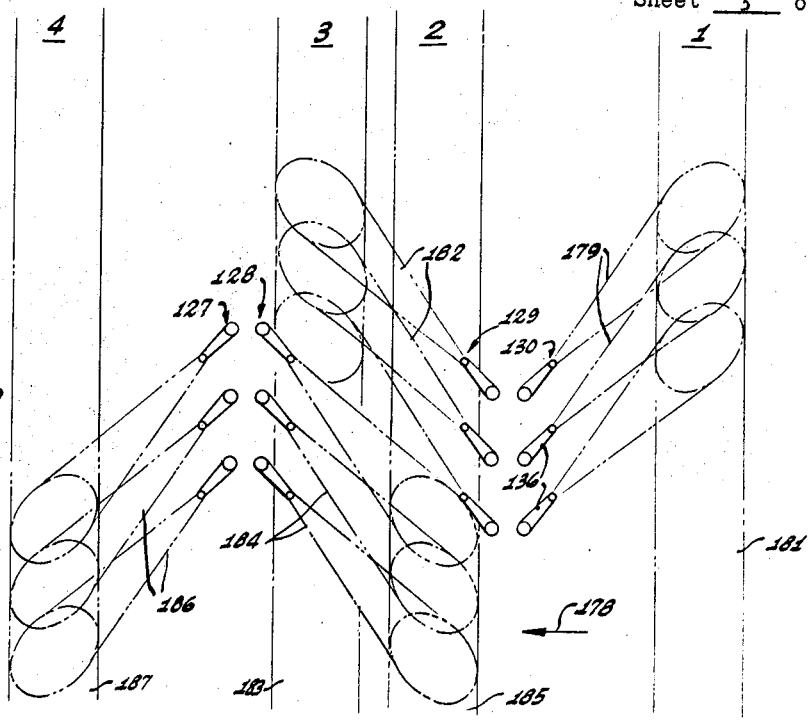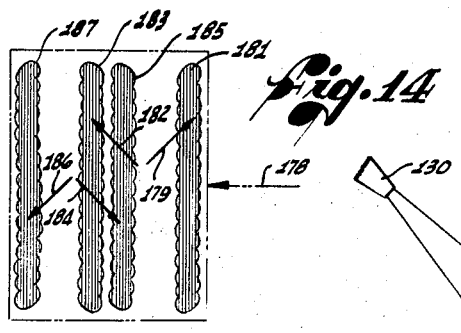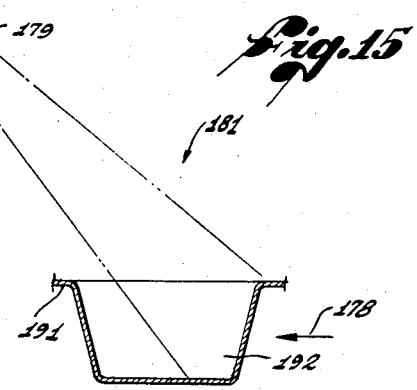

3,424,128
APPARATUS FOR GREASING BAKING PANS
Norman V. Beaman, La Habra, Calif., assignor to Par-Way Mfg. Co., Los Angeles, Calif., a corporation of California
Filed Nov. 10, 1966, Ser. No. 593,487
U.S. Cl. 118—314  9 Claims
Int. Cl. A21b 3/16; A21d 8/08; B05c 5/00

ABSTRACT OF THE DISCLOSURE

A baking pan greasing machine having a plurality of rows of atomizing nozzles directed angularly downwardly, the rows extending transversely across the path of travel of the baking pan through the machine, the nozzles of each of the rows being directed in the same directions, and the nozzles of different rows being directed at different angles spaced substantially 90° apart, so that all nozzles are directed along direction lines diagonally of the direction of travel of the pan past the rows of nozzles. A short spacing interval between nozzles is used in each nozzle row.

---

The present invention relates generally to apparatus for coating with oil or grease the surfaces of pans for use in baking bread, muffins, cakes and like products in commercial bakeries. More particularly, the present invention relates to apparatus for automatically coating baking pan surfaces substantially uniformly and completely by means of a fine spray of greasing liquid or oil, in a continuous automatic operation.

In commercial bakery operations, it is standard practice to grease the inside surfaces of baking pans by applying a coating of oil or grease to prevent the baked product from sticking to the pan. In view of the large volume output of such bakeries, it is desirable to effect the greasing operation expeditiously and with minimum labor and to supply a thin, even film, avoiding excess application of oil and grease. It is particularly desirable to avoid both uncoated pan surface spots to which the baked product might stick and large drops or heavy coated portions which might mar the surface of the baked product.

Where the coatings have been applied manually, not only is the application time consuming and expensive, but the coating is often applied unevenly and portions of the pan surface may be left uncoated for the product to stick thereto.

In automatic operations heretofore, the number of spray nozzles and the direction of application of the spray has been so limited that in order to insure the application of a sufficient amount of oil and grease to all of the inclined surfaces of a baking pan cavity, it has been necessary to supply so much of the oil and grease that the horizontal portions of the pan have been excessively coated. Also, where the coating has been supplied from the top, large drops of oil have frequently fallen onto the pan surface with resultant imperfections in the surface of the baked product.

To avoid the falling drops and to alleviate in part the heavy coating on the pan cavity bottom while sufficiently coating the inclined walls of the pan, constructions in the past have applied the coating from the bottom to the pan in inverted position, but this has many disadvantages in complicating the handling of the pan, applying the spray against gravity with drip-back to the spray applicators, difficulty of visual examination, and many other objectionable features.

According to the present invention, the apparatus applies the oil or liquid grease from above the pan which therefore retains its normal upright position. The spraying of the greasing film in each individual pan cavity is affected by a plurality of nozzles directed in different azimuthal angular directions so as to insure full coverage of all of the inclined surfaces of the pan as well as the bottom surface thereof. While there is wide overlapping of the coating film on the inclined surfaces as well as on the bottom of the pan cavity, the excess oil or grease is much less than has heretofore been the case. Furthermore, dropping of oil or grease onto the pan surface in the form of large drops is avoided by a novel nozzle construction and mounting which feeds any oil collecting on surfaces above the pan to the nozzle orifices where it is atomized in the same manner as the regularly supplied oil.

The coating apparatus of the present invention is preferably completely self-contained and exhausts the atomizing air from the interior of the machine by an exhaust blower through a filter system which keeps all of the coating material within the machine and exhausts only clean air to the atmosphere.

The machine incorporates a conveyor for automatically moving the pans to be coated under and past banks of nozzles which form bands of finely atomized oil droplets extending across the pan surface and directed at complementary azimuthal angles to insure full coverage of all side and bottom surfaces of the pan cavities, regardless of the shape thereof. The pan cavities are subjected to the bands of different directional coating spray in succession as the pan is automatically moved through the machine from the pan entrance to the pan delivering end thereof to coat successive sectors of the pan cavities with the greasing film.

It is, therefore, an object of the present invention to provide improved apparatus for automatically substantially uniformly and completely greasing the surfaces of baking pans by spraying a thin film of oil or grease thereon.

Another object of this invention is to provide a new and improved baking pan coating apparatus employing a plurality of banks of nozzles for spraying finely atomized oil or grease, the nozzles being directed at an angle intermediate the horizontal and vertical and the nozzles in separate banks being directed in complementary azimuthal directions to insure complete coverage of the pan cavities.

Another object of this invention is the provision of an improved baking pan coating device for automatically and continuously spraying a thin film of oil or grease onto the pan surfaces from nozzles located above the pans, including provision for preventing the dropping of large drops of oil onto the pan surfaces.

A further object of this invention is the provision of an improved self-contained apparatus for coating baking pan cavities with a film of oil or grease from continuously operating nozzles at which the coating material is atomized into fine droplets by air flowing with the oil from the nozzles, in which a large capacity exhaust blower draws the atomizing air and additional air from the entrance and exit of the apparatus through filters before exhausting it to the atmosphere to insure the collection and retention of the greasing material within the apparatus.

A still further object of the present invention is the provision of an improved bake pan cavity greasing device employing a plurality of banks of continuously operating nozzles directed to cover sections of the bake pan cavity in succession as the bake pan is moved past the spraying nozzles.

Yet another object of this invention is the provision of an improved bake pan spraying apparatus in accordance with the immediately preceding object in which the nozzles are directed at an angle between the horizontal and vertical and in complementary directions in azimuth to successively cover sectors of the pan cavity as the pan moves past the nozzles to apply a complete coating of greasing material over the entire cavity surface.

These and other objects and features of the invention will be apparent to those skilled in the art from the following specification and the appended drawings, in which:

FIGURE 1 is a perspective view of a pan spraying apparatus according to the present invention;

FIGURE 2 is a longitudinal vertical sectional view of the line 2—2 of FIGURE 1;

FIGURE 2A is an enlarged detailed view, partly in section, within the circle 2A of FIGURE 2;

FIGURE 3 is a side elevational view of the apparatus;

FIGURE 4 is a diagrammatic representation of the flow path for the greasing liquid;

FIGURE 5 is a sectional view through the liquid filter on line 5—5 of FIGURE 3;

FIGURE 6 is a transverse sectional view on the offset line 6—6 of FIGURE 3;

FIGURE 7 is an enlarged view partially in section taken within the circle 7 of FIGURE 6;

FIGURE 8 is an enlarged view partially in section taken in the circle 8 of FIGURE 6;

FIGURE 9 is an enlarged detailed sectional view of the atomizing air supply taken on line 9—9 of FIGURE 3;

FIGURE 10 is an enlarged detailed sectional view of a connection to an oil supply tube taken on line 10—10 of FIGURE 3;

FIGURE 11 is a bottom plan view of the banks of nozzles for spraying the greasing material;

FIGURE 12 is a perspective view of one of the spray nozzles;

FIGURE 12A is a view of a spray nozzle from the orifice end thereof;

FIGURE 13 is a diagrammatic representation of how the greasing material sprayed from the nozzle banks forms bands at the pan level;

FIGURE 14 is a diagrammatic representation of the band distribution of the sprayed greasing material at the pan level;

FIGURE 15 is a generally diagrammatic representation of greasing material entering a pan cavity.

The pan spraying apparatus according to the present invention, in the specific embodiment selected for illustration herein, is indicated by the numeral 21 and includes four corner tubular supporting legs 22 within which are telescopically received lower supporting legs 23, adjustably held therein by means of set screws 24 threaded into bosses 25 rigidly mounted on the legs 22, as by welding. At the bottoms of the legs 23 are castered brackets 26 in which are rotatably mounted rollers 27 equipped with foot-operated brakes 28.

Adjacent the bottoms of the corner legs 22 are welded or otherwise secured mounting strips 29 to which are mounted, as by bolts 31, like strips or brackets 32 rigidly secured to a rectangular frame 33. On the upper ends of the legs 22 are rigidly secured, as by welding, end plates 34 and side plates 35. The end plates 34 are joined to the side plates 35 at the corners and are further connected by inclined plates 36 and 37 which collect greasing material dripping thereon and lead it back to an open-top, rectangular tank or reservoir 38 for the greasing oil.

In the opposite end wall 39 of the reservoir 38, in bearings 41 mounted thereon, is pivotally mounted a shaft 42 extending the length of the reservoir 38 and carrying therein a perforated agitating plate 43 which is oscillated within the reservoir to stir the material therein, as indicated by the arrow 44 in FIGURE 2. At the exterior of the reservoir 38, a crank arm 45 is rigidly mounted on the shaft 42 to be oscillated by a rod 46 connected eccentrically to a sprocket 47. The reservoir 38 is provided at each side with filling hoppers 48 having openable covers 49.

The conveyor in the illustrated exemplary embodiment is in the form of a plurality of parallel continuous chains 51, six in number as illustrated, which are carried in W-shaped slots 60 in the periphery of pulley wheels 52 and 53 located, respectively, adjacent the entrance 54 and delivery exit 55 for baking pans passing through the coating apparatus. The wheels 53 are rigidly mounted by set screws on a shaft 56 journalled in the opposite side plate 35 adjacent the exit 55. The wheels 52 are mounted on a shaft 57 likewise journalled in the side plate 35 but adjacent the entrance 54. The wheels 52 and shaft 57 are free turning, while the wheels 53 are rigidly mounted on the shaft 56 on which, in turn, is rigidly mounted a drive sprocket 58 connected by a drive chain 59 to the sprocket 47.

The conveyor chains 51 are supported horizontally in their upper, pan-carrying pass by means of elongated channel members 61 carried in interlocking relation by T-shaped elements 50 mounted on spools 63 adjustably supported on transverse rods 62. The channel members 61 are desirably formed of a low friction plastic material, such as nylon or the like. The pulley wheels 52 and 53 may likewise be formed of plastic material and the wheels 53 drive the chains 51 of the conveyor by frictional engagement of the chains in the W-shaped slots 60.

A pair of opposite side rails 64 are adjustably mounted at opposite sides of the conveyor chains 51 and are adjustably transversely of the device to conform to the length of the pans to be transversely shifted through the apparatus, thereby serving to guide the pans.

A channel bracket 65 mounted within the frame 33 has a U-shaped channel 66 rigidly mounted thereon across which extend supporting rods 67. A bracket 68 carrying an electric motor 69 is adjustably, slidably mounted on the rods 67. The position of bracket 68 and motor 69 transversely of the apparatus is adjustable by a hand wheel 71 turning an adjusting shaft 72 to vary the speed of belt 77 driven by an adjustable speed pulley 78 on the shaft of motor 69.

A gear reduction box 73 is mounted on the frame 33 on a channel bracket 74 therein and has input shaft 75 carrying a pulley 76 receiving the drive belt 77. The sprocket 47 is mounted on the output shaft of the gear box 73 to be driven at reduced speed therethrough. Also mounted on the input shaft 75 is a second pulley 79 connected by a belt 81 to a pulley 82 mounted to drive a pump 83 for the greasing liquid, the pump 83 being also mounted on the chanel bracket 74.

Between a side plate 35 and the frame 33 is mounted a relatively low pressure centrifugal blower fan 84 having an inlet 85 and a scroll 86 with an outlet 87. The blower 84 is of conventional construction and is driven by its individual motor 88.

Above the side plates 35 are mounted a pair of upper side plates 89 and 91, the side plate 91 carrying an integral cover plate 92 overlapping the side plate 89. End plates 93 extend between the side plates 89 and 91 at the front and back and define the entrance and exit openings 54 and 55 between the bottom flanges on the end plates 93 and the upper edges of the end plates 34.

A pair of parallel supporting angles 94 and 95 extend transversely of the apparatus between the side plates 89 and 91 at opposite sides of the transverse median plane. The angle brackets 94 and 95 have vertically extending portions which carry outwardly extending brackets or channels 96 which cooperate with inwardly extending brackets or channels 96 which cooperate with inwardly extending channel brackets 97 to support inclined baffle plates 98. The baffle plates 98 incline downwardly toward the sides from the longitudinal median plane of the apparatus and require the exhausting air to pass upwardly around their side edges 99. Upon the top plate 92 is mounted an exhaust blower 101 which is in direct communication with the space 102 above the baffles 98, but which communicates with the space below the baffles 98 only by means of passage around the outer side edges 99 thereof. Between the chamber 102 and the baffles 98 are mounted opposed channel brackets 103 and 104 in which are carried removable filters 105 through which all of the air exhausted through the blower 101 must pass to exhaust only clean air to the atmosphere. Blower 101 may also be of the centrifugal type and is provided with a downwardly directed hood 106 from which the air exhausts to the atmosphere.

The blower 101 is desirably of larger capacity than the blower 84, for example of double capacity, to insure exhausting of all the atomizing air through the blower 101, with no portion thereof passing out through the entrance or exit from the apparatus. Desirably, the large capacity blower 101 creates a suction at the entrance and exit openings so that outside air, in addition to the atomizing air, passes around the baffles 98 and through the exhaust blower 101, thereby precluding unfiltered atomizing air leaving the apparatus.

Between the angle bracket supports 94 and 95 is rigidly secured a greasing oil atomizing and spraying device 107. This includes an air-tight enclosure having a top plate 108, front and back walls 109, a full side wall 111 and split side walls 112 and 113 at one side, between which is disposed an air frame inlet 114. The bottom wall for the device 107 is made up of relatively inclined plates 115–118, located at substantially 90° to each other, as shown in FIGURE 2, extending the full width of the device 107 and disposed at substantially 45° to both the horizontal and vertical.

At the side of the device 107 with the split side walls 112, 113, an inclined wall 119 interconnects the plates 116, 117 which are discontinued thereabove, as shown in FIGURE 9, so as to provide a chamber 121 for the entrance of atomizing air which passes into the general chamber 122 extending from side-to-side and front-to-back of the device 107. The chamber 121 is connected through the air inlet frame 114 to a pipe elbow 123 mounted on the device 107 by a stud 124 and nut 125 and connected at its lower end by a coupling 126 to the outlet 87 of the blower 84.

The banks of nozzles 120 are indicated by rows 127, 128, 129, and 130 disposed at the edges of the apices formed at the junctions of bottom plates 115, 116 and 117, 118, respectively. The individual nozzles in each row are shown more particularly in FIGURES 2A, 12, and 12A and have a generally inverted pyramidal, four-sided exterior including dissimilarly inclined bottom surfaces 131 and top surfaces 132 whose edges are substantially horizontal and tightly mounted against plates 115–118, with the upper edges of the surfaces 131 meeting at the apices formed at the plate junctions. The side surfaces of the nozzles are also of dissimilar inclination, with a short surface 133 and a longer surface 134, the surfaces 131–134 converging downwardly to terminate in a substantially circular nozzle opening 135 which communicates by means of a generally conical bore 136 through opening 137 with the general air chamber 122 within the device 107. The individual nozzles 120 are mounted on the plates 115–118 to be removable therefrom, as by studs 138.

Between side wall 111 and split side wall 112 and above the nozzle rows 172 and 128 extends a transverse tube 139 for the passage of the greasing oil. Between the side wall 111 and the split side wall 113 extends a like tube 141. From the tubes 139 and 141, smaller feed tubes 142 extend downwardly through the nozzle bores 136 and have ends 143 substantially co-terminous with the ends of the nozzles 120. The oil is thereby fed through the small tubes 142 to the nozzle orifices where it is caught up and atomized by the air flowing through the nozzle bores 136 about tubes 142. The connections to the tubes 139 and 141 are the same for both ends of both tubes and both sides of the spray device 107, the side showing in FIGURE 1 being the inlet side for the oil flowing into the transverse tubes 139 and 141.

As shown in FIGURE 10, an end of the tube 141 is received in the counterbore at the inner end of a main passage bore 144 through the split end wall 113, the end of the tube abutting against the shoulder 145 and being surrounded by a sealing O-ring 146. The bore 144 is communicated by a passage 147 through a tubing connector in which is mounted oil return tubing 148. For through-cleaning tubes 139, 141, the outer ends of the bores 144 are closed by removable arms 149 having integral plugs 151 extending therefrom carrying O-ring seals 152 which extend into and seal the outer ends of the bores. The arms 149 are removably held in place by nuts 153 threaded onto studs 154 carried by the sidewalls. The construction of FIGURE 10 is duplicated at both ends of each of the tubes 139, 141.

The return tubing from tube 139 is designated 155, and the inlet tubing to the tubes 139 and 141 are designated 156 and 157, respectively. The outlet tubing 148, 155 lead to the reservoir 38, as shown in FIGURE 4. The inlet tubing 157 joins at a T to tubing 158 which is connected to one outlet of a proportioning valve 159 having an adjusting knob 160. The other outlet from valve 159 is connected by tubing 161 back to the reservoir 38. The inlet to the proportioning valve 159 is connected by tubing 162 through a filter 163 and tubing 164 to the outlet of pump 83, whose inlet is connected by tubing 165 to the reservoir 38, adjacent the bottom thereof.

Filter 163 is shown in section in FIGURE 5 with a main body outer cylindrical wall 166 having lugs 167 connected thereto at one end to receive a pin 168 to removably hold in place an end head 169. The inner face of head 169 has a cone 171 thereon which cooperates with a cone 172 on the opposite head 173 to support a cylindrical filtering screen 174 concentrically with the body wall 166. The inlet to the filter is internally of the filtering screen 174 and the outlet external thereto.

The construction of the individual nozzles in the banks 127–130 is shown more particularly in FIGURES 2A, 12, and 12A, and in addition to the structure previously described, the corner edges defined by the surfaces 131, 132, 133, and 134 which converge to the nozzle end 135 may be provided with notches 174 at the nozzle orifice into which oil flowing down these corner edges will be directed to flow toward the axis of the nozzle to insure it being atomized by the air passing through the bore 136. While not essential, the notches provide additional insurance against the dropping of a large drop of oil onto the pan surface.

The motors 69 and 88 and the motor driving the centrifugal blower 101 are connected in parallel to be simultaneously controlled by a standard motor control switch 175. The electrical circuit is conventional and has not been specifically illustrated.

The nozzles 120 may have their bores 136 at any desired acute angle to the vertical and horizontal and have been symmetrically disposed at substantially 45° thereto, although this may be increased or decreased within wide limits within the scope of the invention. The bores 136 are arranged in azimuth with respect to each other at angles which are determined generally by the number of the rows or banks 127–128 so that the baking pan surfaces are completely covered with the greasing film.

In the specific embodiment shown, employing four banks of nozzles 127–130, the nozzle bores direct the sprays therefrom in a substantially 0°–90°–180°–270° azimuth relation. The location of the nozzles in the banks is shown in the bottom plan view of FIGURE 11 wherein it is shown that the rows do not extend to the sides at certain locations but because of the throw of the angularly directed spray from the nozzles, the band coverage is complete as will be seen in FIGURES 13 and 14. At these locations are mounted triangular plates 176, 177 having their bottom edges directed downwardly toward the sides so that any drip therefrom is outside the pan area.

FIGURE 13 shows the manner in which the nozzle banks 127–130 form bands of spray at the pan level with the sprays directed in 90° relationships to insure complete coverage of the pan cavity in successive increments. Referring to FIGURE 13, the nozzles in the row 130 have their bores 36 directed at 45° angles to the longitudinal and transverse planes through the apparatus so that they are directed at a 45° angle toward the entrance and the righthand side of the apparatus, looking from the entrance thereto, the direction of movement of a pan to be coated being indicated by the arrow 178. The individual sprays 179 from the nozzle bank 130 expand as they move downwardly and overlap at the pan level to form a band 181, also shown in FIGURE 14. The bores of the nozzles in the row 129 are directed in azimuth 90° counterclockwise from the nozzles in the row 130, pointing toward the apparatus exit and to the righthand side, looking from the entrance. The individual sprays 182 from the nozzle row 121 likewise diverge and overlap at the pan level to form a band 183. The bores of the nozzles of row 128 are directed forwardly and toward the lefthand side as viewed from the entrance and the individual sprays 184 diverge and overlap at the pan level to form a band of spray 185 thereat. The nozzle bores of the row 127 are directed rearwardly and toward the lefthand side as previously viewed, and the individual sprays 186 diverge and overlap to form a spray band 187 at the pan level. The directions of the sprays 179, 182, 184, and 186 are indicated by the likewise numbered arrows in FIGURE 14. The sprays 182 and 184 pass each other while still restricted in size without interference.

FIGURE 15 is a more or less diagrammatic representation showing how a pan 191 with a cavity 192 moving in the direction 178 might be engaged at a given instant by the spray 179 from the row of nozzles 130 as the pan cavity passes through the spray band 181.

Attention is also called to FIGURE 6, showing that the transverse spacing interval of the nozzles in each row, for a multiple cavity baking pan, is made preferably slightly smaller than the width of a cavity. This is an important feature for such multiple cavity pans, in that is minimizes the amount of overlap of grease in the individual cavities.

The operation of the pan coating apparatus according to the present invention will now be described with reference to the figures of the drawing and the previous description thereof. To initiate operation, the reservoir 38 is filled with greasing oil through one of the hoppers 48, and the apparatus is started at the motor control switch 175 to energize motors 69, 88, and the motor for the exhaust blower 101. The speed of the conveyor chains 51 is adjusted by the hand wheel 71 to change the effective diameter of adjusted speed pulley 78 and the speed of rotation of the input shaft 75 to the gear reduction box 73. The output sprocket 47, through chain 59, drives sprocket 58 and shaft 56 to rotate the wheels or pulley wheels 53, which thereby move the upper pass of the chains 51 longitudinally of the apparatus from the inlet end 54 to the outlet 55.

Pulley 79 on shaft 75 drives pulley 82 on the pump 83 through belt 81. Pump 83 pumps greasing oil from the reservoir 38 through the filter 163 to the proportioning valve 159 which is adjusted by its manual knob 160 to divide the outflow therefrom to secure the desired flow through the tubing 159, 153 and 156, 157 to the transverse oil supply tubes 139 and 141. Greasing oil is thereby supplied at low pressure to the feed tubes 142 which lead it to the nozzle ends 135. At the same time, motor 88 is driving the centrifugal blower 84 to put air at relatively low pressure into the chamber 122 whence it exits through the nozzle bores 136 about the ends 143 of the oil feed tubes 142. The oil to the tubes 139 and 141 is supplied at relatively low pressure and the atomizing air from the centrifugal blower 84 is likewise at relatively low pressure sufficient to atomize the oil from the tubes 142 into very fine droplets or spray directed in the directions of the axes of the nozzle bores 136 to form the spray bands 181, 185, 183, 187 at pan level in that order from the inlet to the outlet of the apparatus, as shown in FIGURE 14. The spray at these bands will be in the direction of the arrows 179, 184, 182, and 186, as previously described.

The motor driving exhaust blower 101 is energized with motors 69 and 88 and sucks air from the interior of the apparatus through the filters 105 from around the side edges 99 of the baffle plates 98. As previously described, the exhaust blower 101 is preferably of much larger capacity than the atomizing blower 84 so that an under pressure is created adjacent the inlet and outlet of the apparatus whereby outside air is drawn in at both the inlet 54 and outlet 55 and mixes with the atomizing air to be drawn therewith through the filters 105 and exhausted to atmosphere from the blower 101. This insures that the greasing oil will be kept within the confines of the apparatus and that overspray will not exit to the atmosphere from the inlet or outlet of the apparatus.

Any portion of the spray which is not caught by a pan on the conveyor chains 51 will pass through the chains and their supports onto the inclined surfaces 36 and 37 and flow downwardly back into the reservoir 38. As the sprocket 47 rotates to drive the conveyor chains 51, the rod 46 will oscillate the arm 45 and the stirrer 43 within the reservoir 38.

Surplus oil supplied to the tubes 139 and 141 passes from the ends of the tubes through the tubing 148 and 155 back to the reservoir 38. The greasing oil is ordinarily supplied at relatively low pressure, and the tubes 139 and 141 do not become filled with oil but have only the bottom portions thereof covering the entrances to tubing 142 filled throughout the length of the tubes 139, 141, the upper portions of the tubes being filled with air or other gas subjected to only low pressure to insure flow of the greasing oil through the feed tubes 142 to the nozzle tips.

The side guides 64 are adjusted to the length of the pans to be greased and these pans are successively fed into the entrance 54 of the apparatus from which they are automatically conveyed by the chains through the apparatus, passing successively through the spray bands 181, 185, 183, and 187, in that order, and different sectors of the pan cavity are covered successively, with considerable overlap, as the pan moves progressively through the coating apparatus. With four banks of nozzles directed at azimuth angles of substantially 45°, the successive band sprays result in substantially a double coating being deposited on the upright surfaces of the pan cavities, while portions of the cavity bottoms may have a greater coating thickness. The coating is a thin film of finely atomized droplets and while sufficiently thick to prevent sticking to mar the appearance of the baked product.

In the spray chamber about the nozzles 120, considerable turbulence can be expected and some of the spray will deposit on the plates 115–118 and on the outer surfaces 131–134 of the nozzles 120. As can be seen from an inspection of the figures of the drawing, all of these surfaces are angularly inclined to the horizontal so that the deposited spray does not accumulate thereon into drops of sufficient size to pull and fall downwardly by gravity but rather as the spray acumulates, it flows downwardly on the inclined surfaces. For example, oil depositing on the plates 115–118 flows downwardly therefrom to the nozzle surfaces where it joins with any oil thereon to flow down the corner edges of the nozzles to the nozzle tips where this oil joins the oil from the tubes 142 to be reatomized into a fine droplet spray. Random heavy coating spots of oil caused by falling drips are thereby avoided.

Once the electrical motors of the apparatus have been started, the spraying action is continuous so long as greasing material is maintained in the reservoir 38 and the pans are automatically sprayed as they are fed in succession through the entrance 54 onto the conveyor chains 51. The baking pan surfaces are, by the nozzle arrangements described and illustrated, given a complete and generally uniform coating which insures that the baked product will not stick to the pan and that the surface of the product will present a pleasing appearance. The arrangement of the nozzles, their shape and the shape of the bottom of the spray device 107, insure that there will be no drip of large drops of greasing oil onto the baking pan surface to adversely affect the appearance of the baked product. At the same time, the apparatus is self-contained and exhausts all of the atomizing air and any greasing oil droplets therein from the apparatus through filters 105 which abstract the greasing material from the air.

The filters 105 and baffles 98 are readily removed from the sides of the machine and the machine may be easily washed out after use, to prevent accumulations therein. Crumbs, carbon, and other foreign materials are removed from the greasing oil by the efficient filter 163 which may itself be readily cleaned by removal of one of its heads and the withdrawal of the filtering screen 174 inside which all foreign material will be deposited, flow through the screen being from the inside outwardly.

While certain preferred embodiments of the invention have been specifically illustrated and described herein, it is understood the invention is not limited thereto and many variations will be apparent to those skilled in the art and the invention is to be given its broadest interpretation within the terms of the following claims.

I claim:
1. Apparatus for applying a thin film of greasing material to the surfaces of baking pans comprising:
   pan supporting means;
   spray means for pan greasing material;
   means for effecting relative movement between said pan supporting means and said spraying means to effect automatic application of the coating film to the pan surfaces, said spray means including a multiplicity of downwardly and angularly directed spray nozzles disposed above said pan supporting means and distributed transversely thereacross;
   means for feeding greasing oil and atomizing air to said spray nozzles to effect atomized spray of greasing material therefrom onto the pan surfaces;
   said nozzles being directed at substantial acute angles to both the horizontal and vertical planes; and
   said nozzles being dividing into a plurality of at least four groups, the nozzles of each group being directed in the same directions in azimuth, and the nozzles of different groups being directed at different angles in azimuth, the directions of the nozzles of the four different groups being angularly spaced from one another in azimuth throughout 360°, all directed diagonally of said direction of relative movement, so that a pan on said supporting means participating in said relative movement is subjected to downwardly directed spray along four different diagonal directions.

2. The subject matter of claim 1, wherein said groups of nozzles are in rows extending transversely of, and spaced longitudinally along, said direction of relative movement.

3. The subject matter of claim 2, wherein the nozzles of the first two rows are directed respectively rearwardly of said direction of relative movement and angularly to one side, and forwardly of said direction of movement and angularly to said one side, and the nozzles of the next two rows are directed respectively rearwardly of said direction of relative movement and angularly to said other side, and forwardly of said direction of movement and angularly to said other side.

4. A pan greasing machine according to claim 1, for greasing a baking pan having a plurality of individual baking cavities spaced thereacross in a direction at right angles to said direction of relative movement of the pan supporting means and spraying means, said baking cavities having a predetermined width dimensions measured at right angles to said direction of relative movement, and wherein the individual nozzles of each of said groups are spaced from one another, in the direction at right angles to said direction of relative movement, by an interval comparable with said predetermined width dimension of said pan cavities.

5. The subject matter of claim 4, wherein said spacing interval of the nozzles of each of said groups is slightly less than said predetermined width dimension of said pan cavities.

6. The subject matter of claim 1, in which the spray nozzles each comprise a hollow body having side walls with downwardly inclined exterior surfaces terminating at the bottom of the body in side wall portions forming a downwardly directed orifice:
   a greasing oil conduit extending through said hollow body and terminating inside said orifice; and
   means for supplying air under pressure to the interior of said hollow body for discharge through said orifice, so as to atomize the oil supplied by said greasing oil conduit, there being notches formed around said nozzle body opening into said orifice for passage of oil draining down said downwardly inclined exterior surfaces of said nozzle body to said orifice whereby said oil is atomized by the discharge of air through said orifice.

7. The subject matter of claim 6, including inclined walls over and connected with said edges of said nozzles, whereby atomized oil collecting on said walls drains downwardly to said nozzle edges and thence to said nozzle orifices.

8. The subject matter of claim 1, in which the spray nozzles each comprise a hollow body having side walls with downwardly inclined exterior surfaces terminating at the bottom of the body in side wall portions forming a downwardly directed orifice, said exterior surfaces of said body meeting in downwardly inclined edges leading to said orifice:
   a greasing oil conduit extending through said hollow body and terminating inside said orifice; and
   means for supplying air under pressure to the interior of said hollow body for discharge through said orifice, so as to atomize the oil supplied by said greasing oil conduit, all in such manner that oil draining down said side walls tends to run along said downwardly inclined edges to said orifice, and to be atomized thereat by the air flow through said orifice.

9. The subject matter of claim 8, including notches formed at the intersections of said edges with said orifice to facilitate passage of said oil running down said edges into said orifice.

References Cited

UNITED STATES PATENTS

| 2,118,212 | 5/1938 | MacLaurin | 118—314 X |
| 2,263,011 | 11/1941 | Roselund. | |
| 2,295,928 | 9/1942 | Bower | 118—314 X |
| 2,633,820 | 4/1953 | Koerber | 118—326 X |
| 3,262,460 | 7/1966 | Huddle et al. | 134—131 X |

FOREIGN PATENTS 553,708  6/1932  Germany.

WALTER A. SCHEEL, *Primary Examiner.*

JOHN P. McINTOSH, *Assistant Examiner.*

U.S. Cl. X.R.

118—315, 317, 324, 326